(12) United States Patent
Howard et al.

(10) Patent No.: US 11,408,836 B2
(45) Date of Patent: Aug. 9, 2022

(54) METHOD FOR INSPECTING COMPONENTS USING COMPUTED TOMOGRAPHY

(71) Applicant: General Electric Company, Schenectady, NY (US)

(72) Inventors: Patrick Joseph Howard, Cincinnati, OH (US); John Charles Janning, Cincinnati, OH (US); Andrew Joseph Galish, West Chester, OH (US); Kevin Layne Moermond, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/804,781

(22) Filed: Feb. 28, 2020

(65) Prior Publication Data
US 2020/0309719 A1   Oct. 1, 2020

Related U.S. Application Data

(60) Provisional application No. 62/827,351, filed on Apr. 1, 2019.

(51) Int. Cl.
*G01N 23/046* (2018.01)
*G06T 7/62* (2017.01)

(52) U.S. Cl.
CPC ............ *G01N 23/046* (2013.01); *G06T 7/62* (2017.01); *G01N 2223/401* (2013.01); *G01N 2223/419* (2013.01)

(58) Field of Classification Search
CPC ........... G01N 23/046; G01N 2223/401; G01N 2223/419; G01N 2223/427; G01N 2223/646; G06T 7/62
See application file for complete search history.

(56) References Cited

U.S. PATENT DOCUMENTS

| 4,691,332 A | 9/1987 | Burstein et al. |
| 4,888,693 A | 12/1989 | Tam |
| 4,969,110 A | 11/1990 | Little et al. |
| (Continued) | | |

FOREIGN PATENT DOCUMENTS

| EP | 3157017 A1 | 4/2017 |
| JP | 2019007972 A | 1/2019 |

OTHER PUBLICATIONS

European Search Report Corresponding to Application No. 20165543 dated Sep. 24, 2020.

*Primary Examiner* — David P Porta
*Assistant Examiner* — Mamadou Faye
(74) *Attorney, Agent, or Firm* — Fitch, Even, Tabin & Flannery LLP

(57) ABSTRACT

A method of inspecting a component using computed tomography is described, the method comprising the steps of: (a) providing a computed tomography (CT) scanner; (b) providing a target component; (c) reviewing the geometry of the component; (d) estimating the best component orientation; (e) orienting the component; (f) scanning the component with the CT scanner; (g) loading CT scan data into 3D image software; (h) registering the best CT scan data; (i) determining acceptable and unacceptable regions of CT scan data; (j) determining additional component orientations; (k) repeating steps (e) through (i) until all regions of CT scan data for the component are acceptable; and (l) creating a merged volume of acceptable CT scan data.

20 Claims, 2 Drawing Sheets

(56) References Cited

U.S. PATENT DOCUMENTS

| | | | |
|---|---|---|---|
| 5,319,693 A | 6/1994 | Eberhard et al. | |
| 7,218,706 B2 | 5/2007 | Hopkins | |
| 7,236,564 B2 | 6/2007 | Hopkins et al. | |
| 8,189,735 B2 | 5/2012 | Khare et al. | |
| 8,750,561 B2 | 6/2014 | Smith et al. | |
| 9,025,855 B1 | 5/2015 | Christoph | |
| 2009/0316853 A1 | 12/2009 | Parazzoli et al. | |
| 2010/0266181 A1* | 10/2010 | Oeckl | G06T 11/006 382/131 |
| 2015/0139381 A1* | 5/2015 | O'Hare | G01N 23/046 378/4 |
| 2016/0279744 A1* | 9/2016 | Harris | C04B 35/62894 |
| 2017/0249729 A1 | 8/2017 | Greene et al. | |
| 2017/0256048 A1 | 9/2017 | Flessner et al. | |
| 2020/0184617 A1* | 6/2020 | Perron | G06T 7/38 |

\* cited by examiner

METHOD FOR INSPECTING COMPONENTS USING COMPUTED TOMOGRAPHY

CROSS-REFERENCE TO RELATED APPLICATION

This application claims priority to provisional application Ser. No. 62/827,351, filed Apr. 1, 2019, which is incorporated herein by reference in its entirety.

BACKGROUND OF THE INVENTION

Computed Tomography (CT) is a computer-aided tomographic process that uses irradiation (such as X-rays) to produce three-dimensional internal and external representations of a scanned object. CT is commonly used as a non-destructive technique to inspect industrial components and assemblies to identify material anomalies and verify geometric dimensions.

The sensitivity to material anomalies and measurement accuracy of CT systems are inversely related to the energy level of the X-ray source used in the CT systems. The amount and density of the material of the object impacts the ability of X-rays to penetrate the part and reach the X-ray detector. When insufficient X-rays reach the detector, the object has been considered uninspectable with X-rays of that energy level.

It is often desirable to maximize the sensitivity and accuracy of the CT system. However, for relatively large and/or dense components, or those with complex geometries, there remains a need for an improved method of CT scanning with the capability to perform inspections of such components with the lowest possible X-ray energy.

BRIEF DESCRIPTION OF THE INVENTION

In one aspect, a method of inspecting a component using computed tomography is described, the method comprising the steps of: (a) providing a computed tomography (CT) scanner; (b) providing a target component; (c) reviewing the geometry of the component; (d) estimating the best component orientation; (e) orienting the component; (f) scanning the component with the CT scanner; (g) loading CT scan data into 3D image software; (h) registering the best CT scan data; (i) determining acceptable and unacceptable regions of CT scan data; (j) determining additional component orientations; (k) repeating steps (e) through (i) until all regions of CT scan data for the component are acceptable; and (l) creating a merged volume of acceptable CT scan data.

BRIEF DESCRIPTION OF THE DRAWINGS

In the drawings, in which like numerals identify like elements throughout the various views.

DETAILED DESCRIPTION OF THE INVENTION

Figure 1:
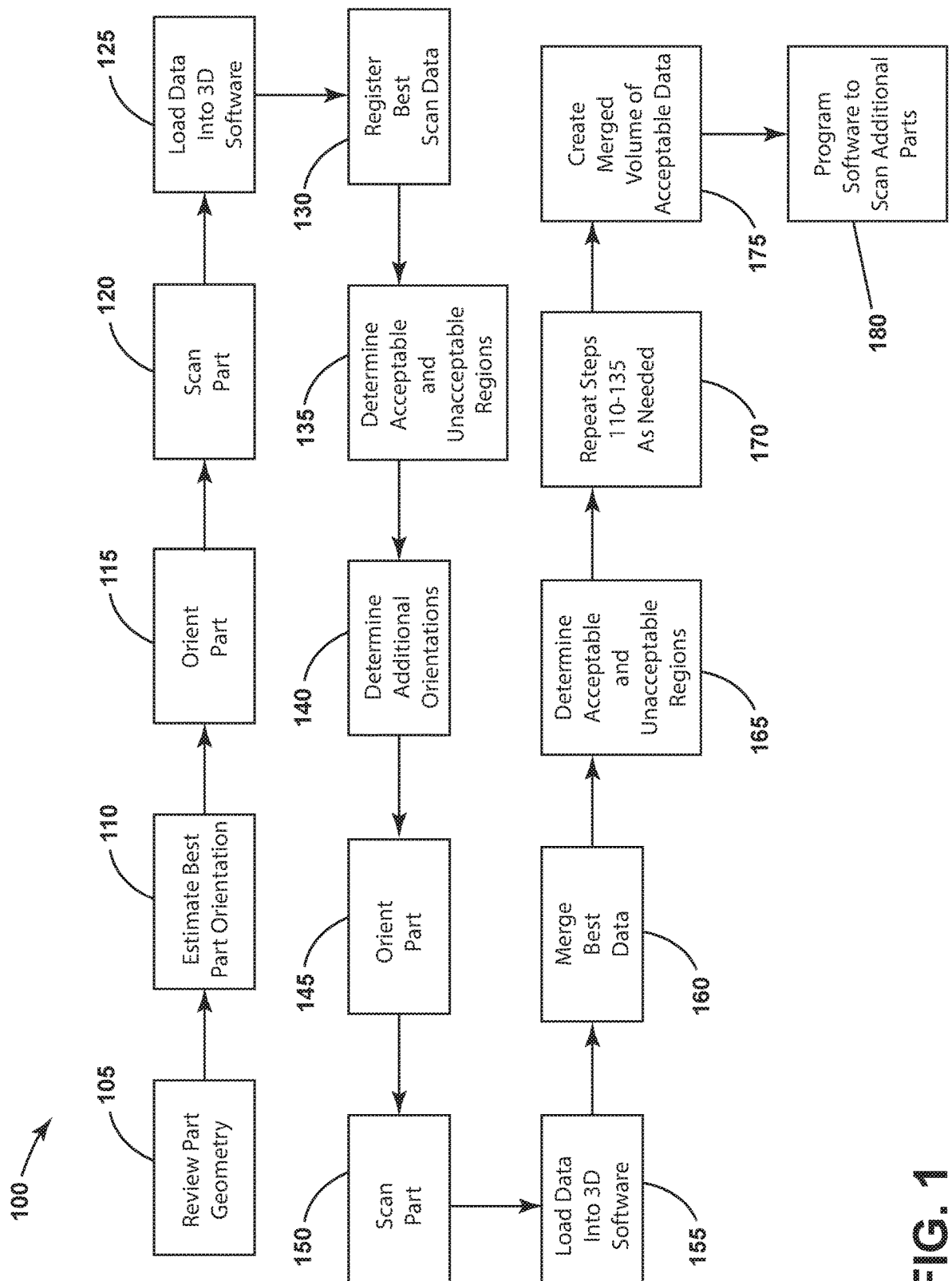
FIG. 1 is a process diagram which depicts an exemplary method of inspection as described herein.

The described embodiments of the present invention are directed to methods for inspecting components using computed tomography. For purposes of illustration, the methods will be described with respect to inspecting large industrial parts which may be difficult to inspect using conventional methods and equipment. It will be understood, however, that the invention is not so limited and may have general applicability, including other types and sizes of components as well as other types of information collection.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is an exemplary illustration of a method of CT inspection 100 as described herein. While much of the discussion herein focuses on CT inspection, it should be understood that the method may be applied to other image collection and inspection technologies where the method can be utilized to enhance the quality of the resulting inspection data.

In the method 100 of FIG. 1, inspection of larger or more dense industrial parts or components is possible with a higher sensitivity and/or greater accuracy than was possible using prior art techniques. This is made possible through use of a lower energy CT system to scan segments of a component where penetration with lower CT energy is possible. These segments are then combined into a single CT image of the component using a reference coordinate system data set of the entire part which is obtained by a different inspection method (higher source energy CT system or a non-contact metrology system) or via access to a Computer Aided Design (CAD) data file. This single combined CT image is a high resolution image which is then utilized for dimensional metrology and detection of discontinuities and/or defects.

The method 100 illustrated in FIG. 1 includes X-ray penetration of the component to determine a plurality of poses for CT inspection that produce high resolution data using either experience, experimentation, or computer analysis. Components may be made from metallic materials or other materials which may be advantageously inspected using CT imaging such as ceramic matrix composite (CMC) materials. Examples of components which may be inspected using the methods described herein include metallic parts used in the assembly of gas turbine engines, such as those commonly used as propulsion systems for aircraft. Components may be inspected using the methods described herein when the components are newly manufactured as well as when the parts have been used in service.

In method 100 the object is of a size where a single scan of a component or part captures the entire component. In the first step, numbered 102, reference data for the component is obtained through access to a CAD data file or through an initial scan of the entire part. In the next step, numbered 105, the operator reviews the geometry of the part. The operator next estimates in step 110 the best orientation and fixturing of the part to minimize long X-Ray path lengths through the solid area of the part. After orienting the part in step 115, in step 120 the operator next CT scans the part on the X-Ray machine using the best orientation to minimize X-Ray path lengths through the part. After the scanning is complete, in step 125 the operator loads the volumetric CT scan data into 3D image viewing software. Next, the software is used in step 130 to register the best orientation CT Scan data to CAD or reference data. In step 135, the scan data is reviewed to determine regions where the image signal is acceptable and determine regions where the image signal is unacceptable. This review is then used in step 140 to determine any additional orientation(s) which may help improve the image signal in regions where the image signal is currently unacceptable.

After this review, in step 145 the operator creates fixturing for the additional orientation and in step 150 CT scans the part in the additional orientation. The additional scan orientation data is loaded in step 155 into a 3D image viewing software and in step 160 merged in the best orientation CT scan data into 3D image viewing software. The best orientation scan data should be first registered to CAD data for the part or to reference geometry data. Any additional scan data should be registered to the best orientation scan data. 3D regions of interest should be created to identify areas of the acceptable signal level in the 3D CT volume scans of the CT data. Next, in step 165 the operator reviews the regions and determines whether additional scan orientations are required to eliminate any additional areas of unacceptable CT image data. In step 170, the steps 110-135 are repeated as needed until acceptable data has been obtained for all regions of the part. The final definition for a specific part will consist of one or more CT scan orientations and fixturing to CT scan the part in those orientations and 3D regions of interest defining the regions of acceptable CT signal data for the various CT scan orientations. One merged volume of acceptable CT signal scanned data is created in step 175 from the various extracted acceptable CT signal regions. Finally, in step 180 software programming is created to automate the process for additional parts to be scanned and processed, typically parts having the same configuration and geometry.

Figure 2:
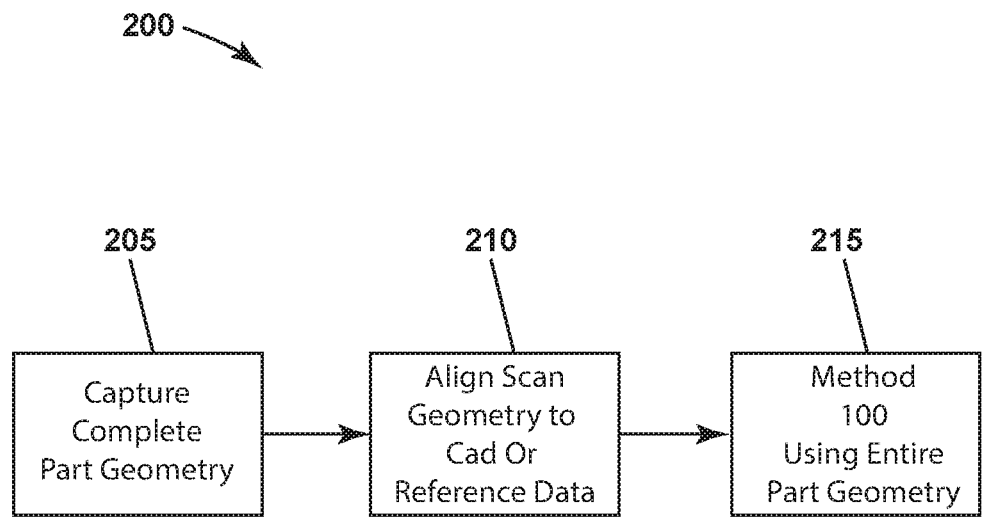
FIG. 2 is a process diagram which depicts an exemplary illustration of a variation of the method of FIG. 1.

In FIG. 2, method 200 is similar to the method 100 of FIG. 1 but is useful for where a single high resolution scan of the part does not capture the entire part geometry. In such a situation, the operator in step 205 uses a lower resolution CT scanner or other method to capture the complete geometry of the part. The complete scan geometry is aligned to CAD or reference data of the part in step 210. From this point, in step 215 the steps of method 100 are used with the only difference being that the entire part geometry scan data from a different source is used to register the various scan orientations of the X-Ray data together. The steps for determining acceptable and unacceptable CT image data, defining the regions of acceptable CT image data, extracting the acceptable CT image data, and creating the one merged volume of acceptable CT image data is the same as described in method 100.

It should be appreciated that application of the disclosed method is not limited to inspection of industrial components, but may have general applicability, including applying the method described herein to other imaging techniques and other types of target articles.

Various characteristics, aspects, and advantages of the present disclosure may also be embodied in any permutation of aspects of the disclosure, including but not limited to the following technical solutions as defined in the enumerated aspects:

1. A method of inspecting a component using computed tomography comprising the steps of: (a) providing a computed tomography (CT) scanner; (b) providing a target component; (c) reviewing the geometry of the component; (d) estimating the best component orientation; (e) orienting the component; (f) scanning the component with the CT scanner; (g) loading CT scan data into 3D image software; (h) registering the best CT scan data; (i) determining acceptable and unacceptable regions of CT scan data; (j) determining additional component orientations; (k) repeating steps (e) through (i) until all regions of CT scan data for the component are acceptable; and (l) creating a merged volume of acceptable CT scan data.

2. The method of aspect 1, further comprising the step (m) of programming software to scan additional components.

3. The method of aspect 2, wherein the additional components have the same configuration.

4. The method of aspects 1-3, wherein step (e) includes fixturing the component.

5. The method of aspects 1-4, wherein step (d) is accomplished minimizing long X-Ray path lengths through the solid area of the component.

6. The method of aspects 1-5, wherein step (h) is accomplished using the 3D image software.

7. The method of aspects 1-6, wherein step (k) is accomplished using different fixturing for each CT scan operation.

8. The method of aspects 1-7, wherein 3D regions of interest are created to cover areas of acceptable signal level in the 3D CT volume scans of the CT scan data.

9. The method of aspects 1-8, wherein a low resolution CT scanner is used to capture an initial complete geometry of the component.

10. The method of aspect 9, wherein the initial complete geometry of the component is used to register the scan orientations from each step (f).

11. The method of aspects 1-10, wherein a noncontact metrology system is used to capture an initial complete geometry of the component.

12. The method of aspects 1-11, wherein the component is formed from a metallic material, is a cast metallic component, is a machined metallic component, is a component of a gas turbine engine, is newly manufactured, is a used component, or is formed from a ceramic matrix composite (CMC) material, or any combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of inspecting a component using computed tomography, the method comprising:
 a first set of steps using a first resolution scan, the first set of steps comprising:
  (a) providing a computed tomography (CT) scanner;
  (b) providing a target component that includes a solid area and providing 3D reference data for the target component to 3D image software;
  (c) reviewing a geometry of the target component;
  (d) estimating a best component orientation in order to minimize long X-Ray path lengths through the solid area;

(e) orienting the target component in the estimated best component orientation;
(f) scanning the target component with the CT scanner to obtain best orientation CT scan data;
(g) loading the obtained best orientation CT scan data into the 3D image software;
(h) registering the best orientation CT scan data to the 3D reference data for the target component;
(i) determining acceptable and unacceptable regions of the best orientation CT scan data;
(j) if one or more regions of the best orientation CT scan data has been determined as being unacceptable, determining additional component orientations for additional scanning;
(k) repeating steps (e) through (j) for one or more of the determined additional component orientations until acceptable CT scan data has been obtained for all regions of the target component; and
(l) creating a merged volume of the acceptable CT scan data for the target component; and
a second set of steps using a lower resolution scan relative to the first resolution scan, the second set of steps comprising:
(m) capturing a complete part geometry;
(n) aligning scan geometry to the 3D reference data; and
(o) repeat steps (a) through (l) of the first set of steps using the lower resolution scan, wherein the second set of steps is performed when the first resolution scan of the target component did not capture an entire geometry of the target component.

2. The method of claim 1, further comprising a step (p) of programming software to scan additional components.

3. The method of claim 2, wherein the additional components have the same configuration and geometry as the target component.

4. The method of claim 1, wherein step (e) includes fixturing the component.

5. The method of claim 1, wherein step (h) is accomplished using the 3D image software.

6. The method of claim 1, wherein step (k) is accomplished using different fixturing for each CT scan operation.

7. The method of claim 1, wherein 3D regions of interest are created to cover areas of acceptable signal level in 3D CT volume scans of the acceptable CT scan data.

8. The method of claim 1, wherein a low resolution CT scanner is used to capture an initial complete geometry of the target component.

9. The method of claim 8, wherein the initial complete geometry of the target component is used to register scan orientations from each step (f).

10. The method of claim 1, wherein a noncontact metrology system is used to capture an initial complete geometry of the target component.

11. The method of claim 1, wherein the target component is formed from a metallic material.

12. The method of claim 1, wherein the target component is a cast metallic component.

13. The method of claim 1, wherein the target component is a machined metallic component.

14. The method of claim 1, wherein the target component is a component of a gas turbine engine.

15. The method of claim 1, wherein the target component is newly manufactured.

16. The method of claim 1, wherein the target component is a used component.

17. The method of claim 1, wherein the target component is formed from a ceramic matrix composite (CMC) material.

18. A method of inspecting a component using computed tomography, the method comprising:
a first set of steps using a first resolution scan, the first set of steps comprising:
(a) providing a computed tomography (CT) scanner;
(b) providing a target component;
(c) reviewing a geometry of the target component;
(d) estimating a best component orientation;
(e) orienting the target component;
(f) scanning the target component with the CT scanner;
(g) loading CT scan data into 3D image software;
(h) registering a best CT scan data;
(i) determining acceptable and unacceptable regions of the best CT scan data;
(j) determining additional component orientations;
(k) repeating steps (e) through (i) until all regions of CT scan data for the target component are acceptable; and
(l) creating a merged volume of acceptable CT scan data; and
a second set of steps using a lower resolution scan relative to the first resolution scan, the second set of steps comprising:
(m) capturing a complete part geometry;
(n) aligning scan geometry to a 3D reference data of the 3D image software; and
(o) repeat steps (a) through (l) of the first set of steps using the lower resolution scan, wherein the second set of steps is performed when the first resolution scan of the target component did not capture an entire geometry of the target component.

19. The method of claim 18, wherein the target component is formed from a metallic material, is a cast metallic component, is a machined metallic component, is a component of a gas turbine engine, is newly manufactured, is a used component, or is formed from a ceramic matrix composite (CMC) material, or any combination thereof.

20. A method of inspecting a component using computed tomography, the method comprising:
a first set of steps using a first resolution scan, the first set of steps comprising:
(a) orienting a target component;
(b) scanning the target component with a computed tomography (CT) scanner;
(c) loading CT scan data into 3D image software;
(d) registering a best CT scan data;
(e) determining acceptable and unacceptable regions of the CT scan data;
(f) determining additional component orientations;
(g) repeating steps (a) through (e) until all regions of CT scan data for the target component are acceptable; and
(h) creating a merged volume of acceptable CT scan data; and
a second set of steps using a lower resolution scan relative to the first resolution scan, the second set of steps comprising:
(i) capturing a complete part geometry;
(j) aligning scan geometry to a 3D reference data of the 3D image software; and
(k) repeat steps (a) through (h) of the first set of steps using the lower resolution scan, wherein the second set of steps is performed when the first resolution scan of the target component did not capture an entire geometry of the target component.

\* \* \* \* \*

UNITED STATES PATENT AND TRADEMARK OFFICE
CERTIFICATE OF CORRECTION

| | |
|---|---|
| PATENT NO. | : 11,408,836 B2 |
| APPLICATION NO. | : 16/804781 |
| DATED | : August 9, 2022 |
| INVENTOR(S) | : Patrick Joseph Howard et al. |

It is certified that error appears in the above-identified patent and that said Letters Patent is hereby corrected as shown below:

In the Claims

Claim 20, Column 6, Line 52, after "the", insert -- best --, therefor.

Signed and Sealed this
Eighth Day of November, 2022

*Katherine Kelly Vidal*

Katherine Kelly Vidal
*Director of the United States Patent and Trademark Office*